US006879466B1

United States Patent
Oveyssi et al.

(10) Patent No.: US 6,879,466 B1
(45) Date of Patent: Apr. 12, 2005

(54) DISK DRIVE INCLUDING AN ACTUATOR WITH A CONSTRAINED LAYER DAMPER DISPOSED UPON AN ACTUATOR BODY LATERAL SURFACE

(75) Inventors: Kamran Oveyssi, San Jose, CA (US); Chen-Chi Lin, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 190 days.

(21) Appl. No.: 10/404,997

(22) Filed: Mar. 31, 2003

(51) Int. Cl.$^7$ .............................. G11B 5/55; G11B 21/16
(52) U.S. Cl. ............................ 360/265.7; 360/265.8; 360/265.9; 360/97.02
(58) Field of Search ....................... 360/97.01, 97.02, 360/98.01, 265.7, 265.8, 265.9

(56) References Cited

U.S. PATENT DOCUMENTS

| | | | | |
|---|---|---|---|---|
| 5,805,387 A | * | 9/1998 | Koester | 360/265.7 |
| 6,271,996 B1 | * | 8/2001 | Houk et al. | 360/244.9 |
| 6,411,472 B1 | * | 6/2002 | Allsup | 360/265.7 |
| 6,480,363 B1 | * | 11/2002 | Prater | 360/265.7 |
| 6,563,676 B1 | * | 5/2003 | Chew et al. | 360/264.7 |
| 6,597,540 B2 | * | 7/2003 | Tsuda et al. | 360/265.9 |
| 6,600,633 B2 | * | 7/2003 | Macpherson et al. | 360/265.8 |
| 2004/0095682 A1 | * | 5/2004 | Dominguez et al. | 360/265 |

FOREIGN PATENT DOCUMENTS

JP          61-271673 A    *    1/1986

* cited by examiner

*Primary Examiner*—Jefferson Evans
(74) *Attorney, Agent, or Firm*—Won Tae C. Kim, Esq.; Stetina Brunda Garred & Brucker

(57) ABSTRACT

An actuator for a disk drive. The actuator includes an actuator body defining an axis of rotation and including a body lateral surface disposed generally parallel to the axis of rotation. The actuator further includes an actuator arm extending from the actuator body. The actuator arm includes an arm base disposed adjacent the actuator body. The actuator further includes a coil support extending from the actuator body opposite the actuator arm. The coil support includes a coil support base disposed adjacent the actuator body. The actuator further includes a constrained layer damper disposed upon the body lateral surface extending from the arm base to the coil support base for mitigation of resonant vibration of the actuator arm and the coil support.

18 Claims, 2 Drawing Sheets

DISK DRIVE INCLUDING AN ACTUATOR WITH A CONSTRAINED LAYER DAMPER DISPOSED UPON AN ACTUATOR BODY LATERAL SURFACE

BACKGROUND OF THE INVENTION

1. Field of the Invention

The present invention relates generally to disk drives, and in particular to a disk drive including head stack assembly including a constrained layer damper disposed upon an actuator body lateral surface.

2. Description of the Prior Art

The typical hard disk drive includes a head disk assembly (HDA) and a printed circuit board assembly (PCBA) attached to a disk drive base of the HDA. The head disk assembly includes at least one magnetic disk, a spindle motor for rotating the disk, and a head stack assembly (HSA). The spindle motor includes a spindle motor hub that is rotatably attached to the disk drive base. The hub has an outer hub flange that supports a lowermost one of the disks. Additional disks may be stacked and separated with annular disk spacers that are disposed about the hub. The head stack assembly has an actuator assembly having at least one transducer head, typically several, for reading and writing data from and to the disk. The printed circuit board assembly includes a servo control system in the form of a disk controller for generating servo control signals. The head stack assembly is controllably positioned in response to the generated servo control signals from the disk controller. In so doing, the attached heads are moved relative to tracks disposed upon the disk.

The head stack assembly includes an actuator assembly, at least one head gimbal assembly, and a flex circuit cable assembly. A conventional "rotary" or "swing-type" actuator assembly typically includes an actuator having an actuator body. The actuator body is configured to rotate on a pivot assembly between limited positions about an axis of rotation. A coil support extends from one side of the actuator body. A coil is supported by the coil support and is configured to interact with one or more permanent magnets to form a voice coil motor. One or more actuator arms extend from an opposite side of the actuator body. A head gimbal assembly includes a transducer head, typically a magneto-resistive ("MR") head, which is distally attached to each of the actuator arms. To facilitate rotational movement of the actuator, the actuator assembly further includes the actuator body that has a bore and a pivot bearing cartridge engaged within the bore. Each magnetic disk includes opposing disk surfaces. Data may be recorded on a single surface or both along data annular regions. As such, the head stack assembly may be pivoted such that each transducer head is disposed adjacent the various data annular regions from adjacent the outer diameter to the inner diameter of each disk.

The actuator assembly has various natural modes of vibration. One such mode is referred to as a "butterfly" mode or the first principal bending mode. During such a butterfly mode of vibration, the actuator arms and the coil support slightly flex or bend toward and away from each other in a plane orthogonal to the axis of rotation and the heads move away from its position on the disk. The butterfly mode of vibration can be excited by those electromagnetic forces in a direction perpendicular to a longitudinal axis of the actuator produced by the current through the coil and the electromagnetic forces interaction with the magnetic field of the magnets. Thus, if the natural frequency of the butterfly mode of vibration is 5 kilo hertz and the applied current into the coil has a 5 kilo hertz component, then this will result in the potential for undesirable excitation of the butterfly mode of vibration. While a filter, such as a notch filter, may be used to remove the frequency component corresponding to the natural frequency of the butterfly mode of vibration, which may negatively impact the capability of the actuator servo control system by reducing its bandwidth. Accordingly, there is a need in the art for a disk drive having an improved actuator assembly design in comparison to the prior art.

SUMMARY OF THE INVENTION

An aspect of the present invention can be regarded as an actuator for a disk drive. The actuator includes an actuator body defining an axis of rotation and including a body lateral surface disposed generally parallel to the axis of rotation. The actuator further includes an actuator arm extending from the actuator body. The actuator arm includes an arm base disposed adjacent the actuator body. The actuator further includes a coil support extending from the actuator body opposite the actuator arm. The coil support includes a coil support base disposed adjacent the actuator body. The actuator further includes a constrained layer damper disposed upon the body lateral surface extending from the arm base to the coil support base for mitigation of resonant vibration of the actuator arm and the coil support.

According to various embodiments, the constrained layer damper may include a stiffener layer and a viscoelastic layer. The viscoelastic layer may be disposed upon the body lateral surface between the actuator and the stiffener layer. The stiffener layer may be formed of a non-magnetic metal. The viscoelastic layer may be formed of a viscoelastic polymer. The actuator arm may include an arm lateral surface. The constrained layer damper may extend along the arm lateral surface. The coil support may include a support lateral surface, and the constrained layer damper may extend along the support lateral surface.

According to another aspect of the invention, there is provided a head stack assembly which includes the foregoing described actuator. In addition, according to another aspect of the invention, there is provided a disk drive. The disk drive includes a disk drive base, a disk rotatably coupled to the disk drive base, and the actuator rotatably coupled to the disk drive base adjacent the disk.

DESCRIPTION OF THE PREFERRED EMBODIMENTS

Figure 1:
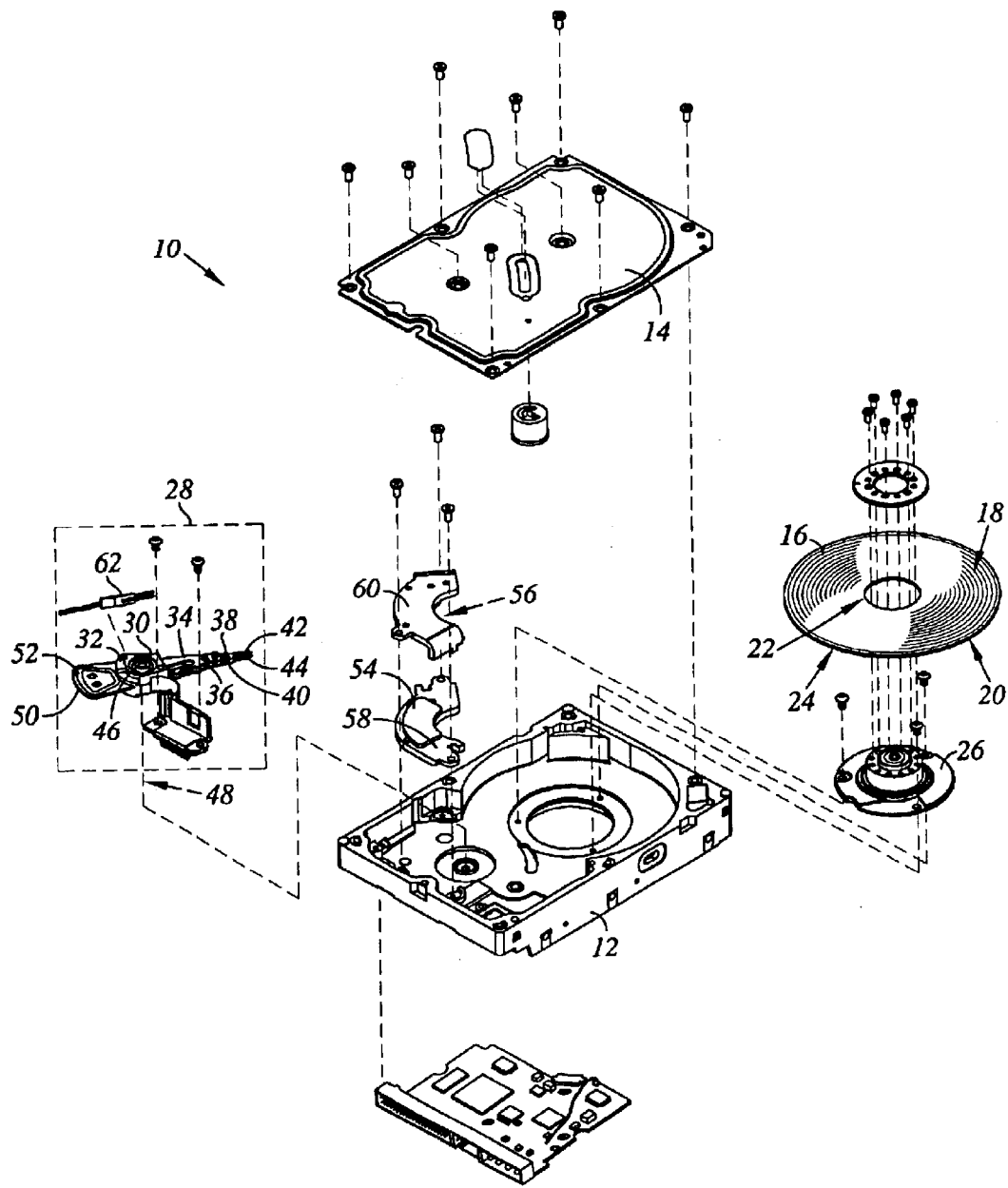
FIG. 1 is an exploded perspective view of a disk drive including an actuator with a constrained layer damper as constructed in accordance with the present invention.

Referring now to the drawings wherein the showings are for purposes of illustrating preferred embodiments of the present invention only, and not for purposes of limiting the same, FIGS. 1–4 illustrate a disk drive in accordance with the aspects of the present invention.

Referring now to FIG. 1, there is depicted an exploded perspective view of a disk drive 10 as constructed in accordance with an aspect of the present invention. The disk drive 10 includes a head disk assembly (HDA) and a printed circuit board assembly (PCBA). The head disk assembly includes a disk drive base 12 and a cover 14 that collectively house at least one magnetic disk 16. The disk 16 contains a plurality of tracks for storing data. The tracks are disposed upon opposing first and second disk surfaces 18, 20 of the disk 16 that extend between an inner disk edge 22 (associated with the inner diameter) and an outer disk edge 24 (associated with the outer diameter) of the disk 16. The head disk assembly further includes a spindle motor 26 for rotating the disk 16. The head disk assembly further includes a head stack assembly 28 rotatably attached to the disk drive base 12 in operable communication with the disk 16. The head stack assembly 28 includes a rotatable actuator 30. In the embodiment shown, the actuator 30 includes an actuator body 32 and actuator arms 34, 36 that extend from the actuator body 32. Distally attached to the actuator arms 34, 36 are first and second suspensions 38, 40. The first and second suspensions 38, 40 respectively support transducer heads 42, 44. It is contemplated that the number of actuator arms may vary depending upon the number of disks and disk surfaces utilized.

The actuator body 32 includes a bore, and the actuator 30 further includes a pivot bearing cartridge 46 engaged within the bore for facilitating the actuator body 32 to rotate between limited positions about an axis of rotation 48. The actuator 30 further includes a coil support 50 that extends from one side of the actuator body 32 opposite the actuator arms 34, 36. In this embodiment, the coil support 50 is configured to support a coil 52. A pair of magnetic elements 54, 56 is supported to mounts 58, 60 which are attached to the disk drive base 12 (magnetic element 56 is indicated by the dashed lead line and it is understood the magnetic element 56 is disposed underneath the mount 60). The magnetic elements 54, 56 may be attached to the disk drive base 12 through other arrangements, such as the magnetic element 56 being directly mounted to the cover 14 which is mechanically engaged with the disk drive base 12. The coil 52 interacts with the magnetic elements 54, 56 to form a voice coil motor for controllably rotating the actuator 30.

Figure 2:
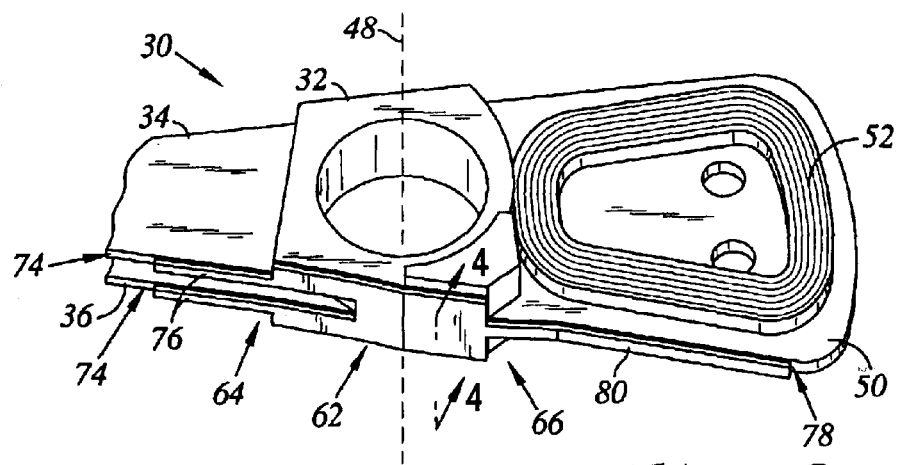
FIG. 2 is a perspective view of a portion of the actuator of FIG. 1 as shown with the constrained layer damper.
Figure 3:
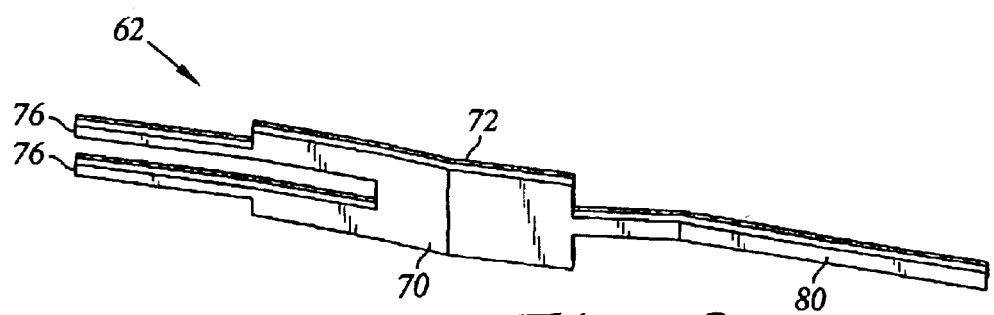
FIG. 3 is a perspective view of the constrained layer damper of FIG. 2.
Figure 4:
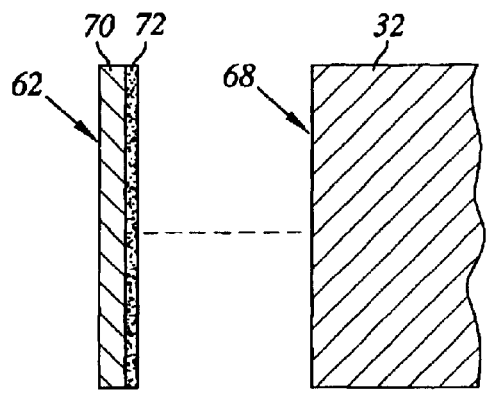
FIG. 4 is an exploded cross-sectional view of the constrained layer damper and a portion of an actuator body of the actuator as seen along axis 44 of FIG. 2.

Referring additionally to FIG. 2, there is depicted an enlarged perspective view of a portion actuator 30. As can be seen the actuator 30 includes a constrained layer damper 62. FIG. 3 is a perspective view of the constrained layer damper 62 of FIG. 2. FIG. 4 is an exploded cross-sectional view of the constrained layer damper 62 and a portion of the actuator body 32 of the actuator 30 as seen along axis 44 of FIG. 2.

An aspect of the present invention can be regarded as the actuator 30 for the disk drive 10. The actuator 30 includes the actuator body 32 which defines the axis of rotation 48. The actuator 30 further includes the body lateral surface 68 disposed generally parallel to the axis of rotation 48. The actuator 30 further includes an actuator arm, such actuator arm 34 of the actuator arm 34, 36. The actuator arm 34 extends from the actuator body 32. The actuator arm 34 includes an arm base 64 disposed adjacent the actuator body 32. The actuator 30 further includes the coil support 50 which extends from the actuator body 32 opposite the actuator arm 34. The coil support 50 includes a coil support base 66 disposed adjacent the actuator body 32. The actuator 30 further includes the constrained layer damper 62 disposed upon the body lateral surface 68. The constrained layer damper 62 extends from the arm base 64 to the coil support base 66 for mitigation of resonant vibration of the actuator arm 34 and the coil support 50.

According to various embodiments, the constrained layer damper 62 may include a stiffener layer 70 and a viscoelastic layer 72. The viscoelastic layer 72 may be disposed upon the body lateral surface 68 between the actuator 30 and the stiffener layer 70. Suitably, the stiffener layer 70 may be formed of a non-magnetic metal. Such non-magnetic metals may include stainless steel, such as 300 series stainless steel, and aluminum. The viscoelastic layer 72 may be formed of a viscoelastic polymer. The viscoelastic layer 72 may be adhesive in nature and may additionally function to maintain the constrained layer damper 62 in position against the actuator 30. The constrained layer damper 62 may be manufactured from sheets of material which may undergo a stamping process.

As mentioned above, the constrained layer damper 62 serves to mitigate resonant vibration of the actuator arms 34, 36 and the coil support 50. The actuator 30, and in particular the actuator arms 34, 36 and the coil support 50, undergoes a variety of resonant vibrations. One of such resonant vibrations is referred to as a butterfly mode of vibration. During such a butterfly mode of vibration, the actuator arms 34, 36 and the coil support 50 slightly flex or bend toward and away from each other in a plane orthogonal to the axis of rotation 48 and the heads 42, 44 move away from their position on the disk 16. The constrained layer damper 62 is positioned adjacent the major flexing or bowing region of the actuator 30 during such butterfly mode of vibration. Because of the specific positioning of the constrained layer damper 62 extending between the arm base 64 to the coil support base 66, such butterfly mode of vibration tends to create a relative shearing movement between portions of the stiffener layer 70 and body lateral surface 68. The viscoelastic layer 72 is positioned between such structures and acts to mitigate such movement by absorbing the mechanical energy associated with such shear movements.

The actuator lateral surface 68 may refer to any of those portions of the actuator 30 which is disposed in planes parallel to the axis of rotation 48. Thus, the actuator lateral surface 68 is not required to be planar and may be contoured in nature as shown. Being parallel to the axis of rotation 68 generally refers to those portions of the actuator 30 which one would readily recognize as a "side" of the actuator 30. In contrast, the actuator arms 34, 36 for example include planar surfaces which are generally disposed in planes which are orthogonal to the axis of rotation 48. The actuator arms 34, 36 move in such planes orthogonal to the axis of rotation 48 during rotation of the actuator 30.

The actuator arms 34, 36 may each include an arm lateral surface 74. The constrained layer damper 62 may extend along each arm lateral surface 74. In this regard, rather than terminating at the arm base 64, the constrained layer damper 62 may include arm portions 76. Similarly, the coil support 50 may include a support lateral surface 78. The constrained layer damper 62 may extend along the support lateral surface 78 and includes a support portion 80.

It is recognized that industry trends are to reduce the overall form factor of the actuator 30 and in particular the height dimension. As the constrained layer damper 62 is disposed upon the "side" of the actuator 30, such positioning does not require any increase in the height dimension of the various components of the actuator 30, such as the actuator arms, 34, 36, the actuator body 32 and the coil support base 50.

According to another aspect of the invention, there is provided the head stack assembly 28 which includes the foregoing described actuator 30. In addition, according to another aspect of the invention, there is provided the disk drive 10. The disk drive 10 includes the disk drive base 12, the disk 16 rotatably coupled to the disk drive base 12, and the actuator 30 rotatably coupled to the disk drive base 12 adjacent the disk 16.

We claim:

1. An actuator for a disk drive, the actuator comprising:
   an actuator body defining an axis of rotation and including an exterior body lateral surface disposed generally parallel to the axis of rotation;
   an actuator arm extending from the actuator body, the actuator arm including an arm base disposed adjacent the actuator body;
   a coil support extending from the actuator body opposite the actuator arm, the coil support including a coil support base disposed adjacent the actuator body; and
   a constrained layer damper disposed upon the body lateral surface extending from the arm base to the coil support base for mitigation of resonant vibration of the actuator arm and the coil support.

2. The actuator of claim 1 wherein the constrained layer damper includes a stiffener layer and a viscoelastic layer, the viscoelastic layer is disposed upon the body lateral surface between the actuator and the stiffener layer.

3. The actuator of claim 2 wherein the stiffener layer is formed of a non-magnetic metal.

4. The actuator of claim 2 wherein the viscoelastic layer is formed of a viscoelastic polymer.

5. The actuator of claim 1 wherein the actuator arm includes an arm lateral surface, the constrained layer damper extends along the arm lateral surface.

6. The actuator of claim 1 wherein the coil support includes a support lateral surface, the constrained layer damper extends along the support lateral surface.

7. A head stack assembly for a disk drive, the head stack assembly comprising:
   an actuator configured to rotate about an axis of rotation, the actuator including:
   an actuator body including an exterior body lateral surface disposed generally parallel to the axis of rotation;
   an actuator arm extending from the actuator body, the actuator arm including an arm base disposed adjacent the actuator body; and
   a coil support extending from the actuator body opposite the actuator arm, the coil support including a coil support base disposed adjacent the actuator body; and
   a constrained layer damper disposed upon the body lateral surface extending from the arm base to the coil support base for mitigation of resonant vibration of the actuator arm and the coil support.

8. The head stack assembly of claim 7 wherein the constrained layer damper includes a stiffener layer and a viscoelastic layer, the viscoelastic layer is disposed upon the body lateral surface between the actuator and the stiffener layer.

9. The head stack assembly of claim 8 wherein the stiffener layer is formed of a non-magnetic metal.

10. The head stack assembly of claim 8 wherein the viscoelastic layer is formed of a viscoelastic polymer.

11. The head stack assembly of claim 7 wherein the actuator arm includes an arm lateral surface, the constrained layer damper extends along the arm lateral surface.

12. The head stack assembly of claim 7 wherein the coil support includes a support lateral surface, the constrained layer damper extends along the support lateral surface.

13. A disk drive comprising:
    a disk drive base;
    a disk rotatably coupled to the disk drive base; and
    a head stack assembly rotatably coupled to the disk drive base adjacent the disk, the head stack assembly including:
    an actuator configured to rotate about an axis of rotation the actuator including:
    an actuator body including an exterior body lateral surface disposed generally parallel to the axis of rotation;
    an actuator arm extending from the actuator body, the actuator arm including an arm base disposed adjacent the actuator body; and
    a coil support extending from the actuator body opposite the actuator arm, the coil support including a coil support base disposed adjacent the actuator body; and
    a constrained layer damper disposed upon the body lateral surface extending from the arm base to the coil support base for mitigation of resonant vibration of the actuator arm and the coil support.

14. The disk drive of claim 13 wherein the constrained layer damper includes a stiffener layer and a viscoelastic layer, the viscoelastic layer is disposed upon the body lateral surface between the actuator and the stiffener layer.

15. The disk drive of claim 14 wherein the stiffener layer is formed of a non-magnetic metal.

16. The disk drive of claim 14 wherein the viscoelastic layer is formed of a viscoelastic polymer.

17. The disk drive of claim 13 wherein the actuator arm includes an arm lateral surface, the constrained layer damper extends along the arm lateral surface.

18. The disk drive of claim 13 wherein the coil support includes a support lateral surface, the constrained layer damper extends along the support lateral surface.

* * * * *